United States Patent
Desjarlais et al.

(10) Patent No.: US 10,185,322 B1
(45) Date of Patent: Jan. 22, 2019

(54) VEHICLE LANDMARK IDENTIFICATION

(71) Applicant: Ford Global Technologies, LLC, Dearborn, MI (US)

(72) Inventors: Frank J. Desjarlais, Canton, MI (US); Ray C. Siciak, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/654,965

(22) Filed: Jul. 20, 2017

(51) Int. Cl.
*G05D 1/02* (2006.01)
*G05D 1/00* (2006.01)

(52) U.S. Cl.
CPC ......... *G05D 1/0214* (2013.01); *G05D 1/0223* (2013.01); *G05D 1/0088* (2013.01); *G05D 2201/0213* (2013.01)

(58) Field of Classification Search
CPC .. G05D 1/0214; G05D 1/0223; G05D 1/0088; G05D 2201/0213
USPC .......................................................... 701/23
See application file for complete search history.

(56) References Cited

U.S. PATENT DOCUMENTS

| | | | |
|---|---|---|---|
| 6,498,620 B2 * | 12/2002 | Schofield | B60N 2/002 348/118 |
| 8,170,788 B2 | 5/2012 | Sjögren et al. | |
| 8,289,142 B2 | 10/2012 | Pawkicki et al. | |
| 8,441,374 B2 * | 5/2013 | Yokoyama | G08G 1/096 340/905 |
| 8,532,862 B2 | 9/2013 | Neff | |
| 8,781,669 B1 | 7/2014 | Teller et al. | |
| 8,855,849 B1 * | 10/2014 | Ferguson | G05D 1/00 701/28 |
| 9,329,596 B2 | 5/2016 | Cima | |
| 9,751,463 B1 * | 9/2017 | Ramcharitar | B60Q 9/00 |
| 2017/0225691 A1 * | 8/2017 | Yamada | B60W 50/10 |
| 2017/0297574 A1 * | 10/2017 | Trageser | B60W 30/16 |
| 2018/0079463 A1 * | 3/2018 | Pearce | B62J 6/00 |
| 2018/0105176 A1 * | 4/2018 | Pawlicki | G01S 13/931 |

* cited by examiner

*Primary Examiner* — Tan Q Nguyen
(74) *Attorney, Agent, or Firm* — Frank A. MacKenzie; Bejin Bieneman PLC

(57) ABSTRACT

A first landmark of a target vehicle is identified. A host vehicle is moved laterally adjacent to the target vehicle such that a second landmark of the host vehicle is a specified longitudinal distance from the first landmark.

20 Claims, 5 Drawing Sheets

VEHICLE LANDMARK IDENTIFICATION

BACKGROUND

Vehicles can travel alongside other vehicles in adjacent roadway lanes when travelling along a roadway. An autonomous vehicle can travel and/or stop near a vehicle in another roadway lane. However, a problem arises in operating the autonomous vehicle to provide for occupant ease and comfort is that the autonomous vehicle may be programmed to stop based on criteria such as a distance from a forward vehicle and/or other criteria related to safe operation of the autonomous vehicle. Such configuration of an autonomous vehicle controller may result in stopping the autonomous vehicle such that the autonomous vehicle windows are aligned with windows of vehicles in other lanes, causing occupant discomfort due to entering a field of view of occupants in the other vehicles.

DETAILED DESCRIPTION

Figure 1:
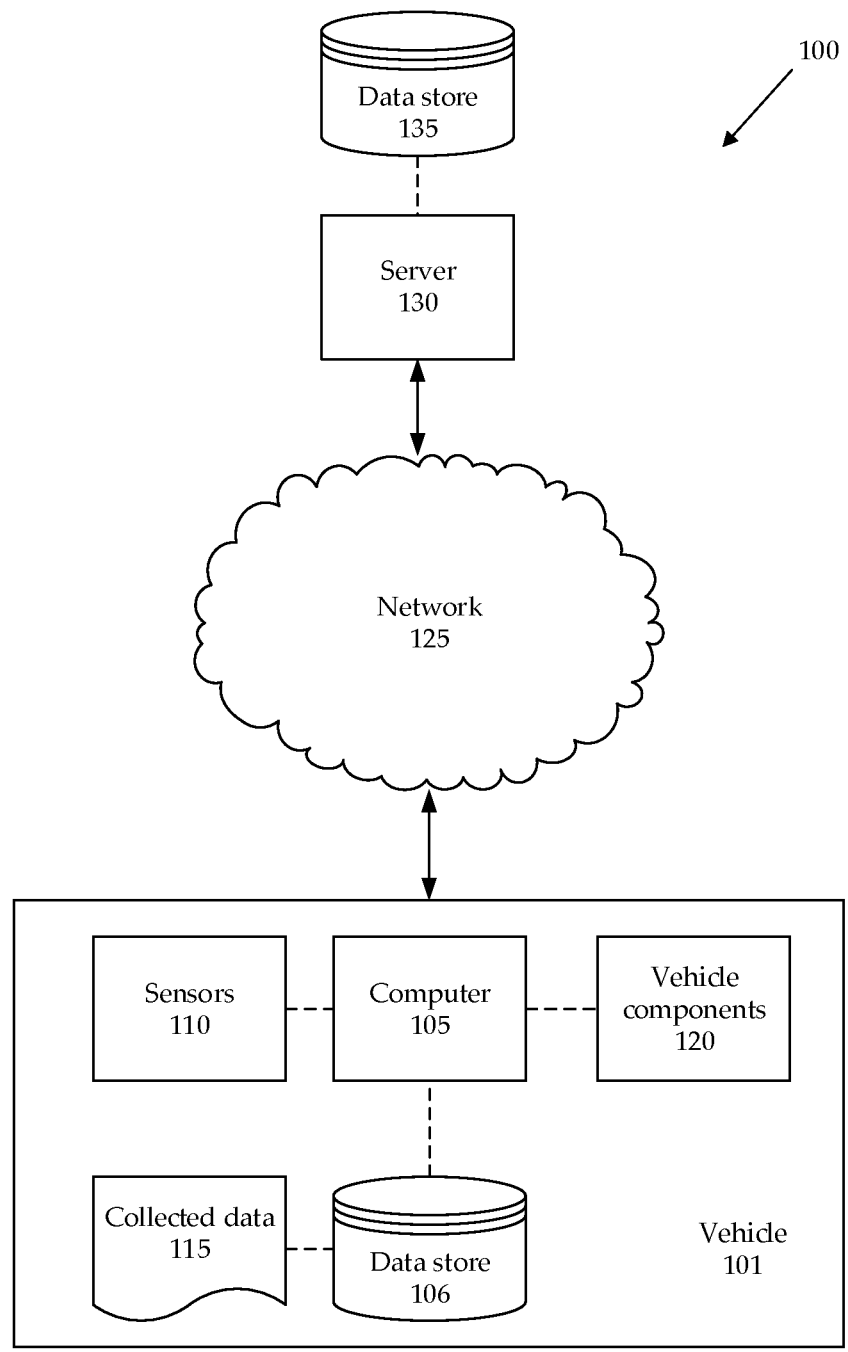
FIG. 1 is a block diagram of an example system for controlling a stopping place of a vehicle.

A system includes a computer programmed to identify a first landmark of a target vehicle and move a host vehicle laterally adjacent to the target vehicle such that a second landmark of the host vehicle is a specified longitudinal distance from the first landmark.

The computer can be further programmed to identify the first landmark based on a predetermined longitudinal distance forward of a rear end of the target vehicle.

The specified longitudinal distance can be zero.

The computer can be programmed to identify the second landmark in the host vehicle as a vehicle seat.

The computer can be further programmed to identify the first landmark as one of a seam between a vehicle door and a frame of the target vehicle and a pillar of the target vehicle.

The computer can be further programmed to receive user input specifying the longitudinal distance.

The computer can be further programmed to receive user input identifying the target vehicle.

The computer can be further programmed to determine a speed of the target vehicle and to adjust a host vehicle speed based on the speed of the target vehicle in addition to the specified longitudinal distance. The speed of the target vehicle can be zero.

The computer can be further programmed to identify a blind spot of the target vehicle and to determine the specified longitudinal distance such that at least a portion of the host vehicle is not in the blind spot.

A method includes identifying a first landmark of a target vehicle and moving a host vehicle laterally adjacent to the target vehicle such that a second landmark of the host vehicle is a specified longitudinal distance from the first landmark.

The method can further include identifying the first landmark based on a predetermined longitudinal distance forward of a rear end of the target vehicle.

In the method, the specified longitudinal distance can be zero.

The method can further include identifying the second landmark in the host vehicle as a vehicle seat.

The method can further include identifying the first landmark as one of a seam between a vehicle door and a frame of the target vehicle and a pillar of the target vehicle.

The method can further include receiving user input specifying the longitudinal distance.

The method can further include receiving user input identifying the target vehicle.

The method can further include determining a speed of the target vehicle and adjusting a host vehicle speed based on the speed of the target vehicle in addition to the specified longitudinal distance. The speed of the target vehicle can be zero.

The method can further include identifying a blind spot of the target vehicle and determining the specified longitudinal distance such that at least a portion of the host vehicle is not in the blind spot.

Further disclosed is a computing device programmed to execute any of the above method steps. Yet further disclosed is a vehicle comprising the computing device. Yet further disclosed is a computer program product, comprising a computer readable medium storing instructions executable by a computer processor, to execute any of the above method steps.

FIG. 1 illustrates an example system 100 for moving a vehicle 101 according to an identified landmark of a second vehicle 101. A computer 105 in the vehicle 101 is programmed to receive collected data 115 from one or more sensors 110. For example, vehicle 101 data 115 may include a location of the vehicle 101, a location of a target, etc. Location data may be in a known form, e.g., geo-coordinates such as latitude and longitude coordinates obtained via a navigation system, as is known, that uses the Global Positioning System (GPS). Further examples of data 115 can include measurements of vehicle 101 systems and components, e.g., a vehicle 101 velocity, a vehicle 101 trajectory, etc.

The computer 105 is generally programmed for communications on a vehicle 101 network, e.g., including a communications bus, as is known. Via the network, bus, and/or other wired or wireless mechanisms (e.g., a wired or wireless local area network in the vehicle 101), the computer 105 may transmit messages to various devices in a vehicle 101 and/or receive messages from the various devices, e.g., controllers, actuators, sensors, etc., including sensors 110. Alternatively or additionally, in cases where the computer 105 actually comprises multiple devices, the vehicle network may be used for communications between devices represented as the computer 105 in this disclosure. In addition, the computer 105 may be programmed for communicating with the network 125, which, as described below, may include various wired and/or wireless networking technologies, e.g., cellular, Bluetooth®, Bluetooth® Low Energy (BLE), wired and/or wireless packet networks, etc.

The data store 106 may be of any known type, e.g., hard disk drives, solid state drives, servers, or any volatile or non-volatile media. The data store 106 may store the collected data 115 sent from the sensors 110.

Sensors 110 may include a variety of devices. For example, as is known, various controllers in a vehicle 101 may operate as sensors 110 to provide data 115 via the vehicle 101 network or bus, e.g., data 115 relating to vehicle speed, acceleration, position, subsystem and/or component status, etc. Further, other sensors 110 could include cameras, motion detectors, etc., i.e., sensors 110 to provide data 115 for evaluating a location of a target, projecting a path of a target, evaluating a location of a roadway lane, etc. The sensors 110 could also include short range radar, long range radar, LIDAR, and/or ultrasonic transducers.

Collected data 115 may include a variety of data collected in a vehicle 101. Examples of collected data 115 are provided above, and moreover, data 115 are generally collected using one or more sensors 110, and may additionally include data calculated therefrom in the computer 105, and/or at the server 130. In general, collected data 115 may include any data that may be gathered by the sensors 110 and/or computed from such data.

The vehicle 101 may include a plurality of vehicle components 120. As used herein, each vehicle component 120 includes one or more hardware components adapted to perform a mechanical function or operation—such as moving the vehicle, slowing or stopping the vehicle, steering the vehicle, etc. Non-limiting examples of components 120 include a propulsion component (that includes, e.g., an internal combustion engine and/or an electric motor, etc.), a transmission component, a steering component (e.g., that may include one or more of a steering wheel, a steering rack, etc.), a brake component, a park assist component, an adaptive cruise control component, an adaptive steering component, a movable seat, and the like.

When the computer 105 operates the vehicle 101, the vehicle 101 is an "autonomous" vehicle 101. For purposes of this disclosure, the term "autonomous vehicle" is used to refer to a vehicle 101 operating in a fully autonomous mode. A fully autonomous mode is defined as one in which each of vehicle 101 propulsion (typically via a powertrain including an electric motor and/or internal combustion engine), braking, and steering are controlled by the computer 105. A semi-autonomous mode is one in which at least one of vehicle 101 propulsion (typically via a powertrain including an electric motor and/or internal combustion engine), braking, and steering are controlled at least partly by the computer 105 as opposed to a human operator.

The system 100 may further include a network 125 connected to a server 130 and a data store 135. The computer 105 may further be programmed to communicate with one or more remote sites such as the server 130, via the network 125, such remote site possibly including a data store 135. The network 125 represents one or more mechanisms by which a vehicle computer 105 may communicate with a remote server 130. Accordingly, the network 125 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

Figure 2:
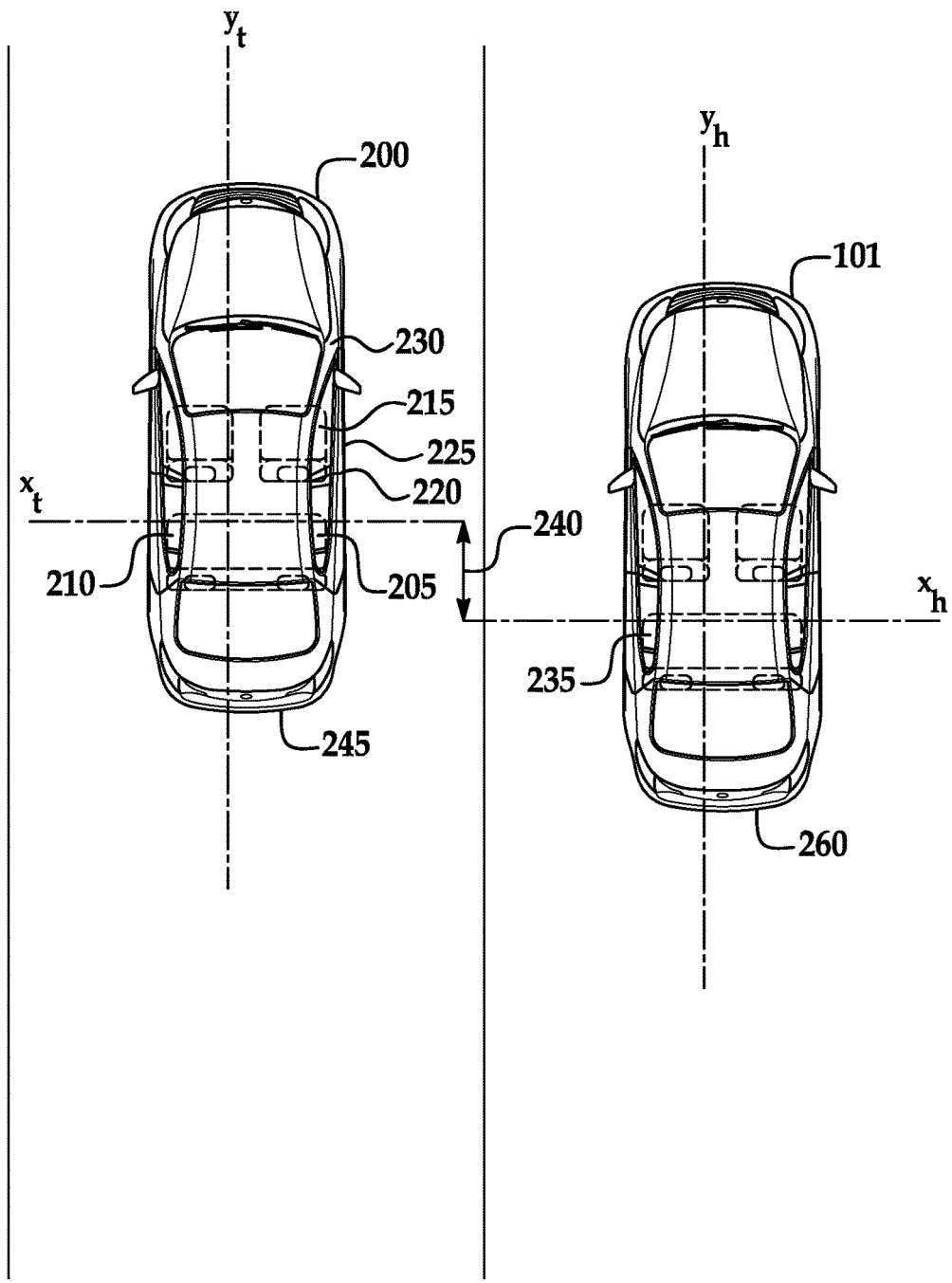
FIG. 2 is a view of a host vehicle stopped according to a position of a target vehicle.

FIG. 2 illustrates an example host vehicle 101 approaching an example target vehicle 200. The host vehicle 101 can have host vehicle axes $x_h$, $y_h$, and the target vehicle 200 can have target vehicle axes $x_t$, $y_t$. As used herein, the axes $x_h$, $x_t$ are "lateral" axes and the axes $y_h$, $y_t$ are "longitudinal" axes. The lateral axes $x_h$, $x_t$ can be specified as axes extending along a line between a driver's side and a passenger's side of the vehicle 101, 200. The longitudinal axes $y_h$, $y_t$ can be specified as axes extending along a center line between a rear end and a front end of the vehicle 101, 200. From the perspective of a user in the vehicle 101, 200, the lateral axes $x_h$, $x_t$ extend left and right, and the longitudinal axes $y_h$, $y_t$ extend forward and backward. That is, forward motion of the vehicle 101, 200 at a steering angle of zero moves the vehicle 101, 200 along the longitudinal axes $y_h$, $y_t$, respectively. The lateral axes $x_h$, $x_t$ are perpendicular to the longitudinal axes $y_h$, $y_t$.

When the host vehicle 101 approaches the target vehicle 200, the host vehicle 101 can move so that the host vehicle 101 is staggered from the target vehicle 200. As used herein, the host vehicle 101 is "staggered" when the host vehicle 101 is a nonzero distance from the target vehicle 200 along the longitudinal axes $y_h$, $y_t$. The computer 105 can identify the target vehicle 200 based on, e.g., image data 115. Alternatively or additionally, a user can provide input (e.g., to a vehicle 101 HMI, a user portable device, etc.) to identify the target vehicle 200.

The computer 105 can collect data 115 to identify a landmark 205 in the target vehicle 200. The data 115 can include, e.g., image data 115 from a camera 110, data 115 from a LIDAR 110, data 115 from a radar 110, data 115 from an ultrasonic transducer 110, etc. As used herein, a "landmark" is a predetermined specified object that the computer 105 can be programmed to recognize based on collected image data 115 from one or more sensors 110. The landmark 205 can be, e.g., a rear seat 210 of the target vehicle 200, a front seat 215 of the target vehicle 200, a seam 225 between a door 220 of the target vehicle 200 and a frame 230 (e.g., at a pillar) of the target vehicle 200, a rear bumper 245, etc. The computer 105 can identify a second landmark 235 in the host vehicle 101.

Upon identifying the landmark 205 and the second landmark 235, the computer 105 can be programmed to move the host vehicle 101 such that a longitudinal distance 240 from the lateral axis $x_h$ projected through the second landmark 235 to the lateral axis $x_t$ projected through the first landmark 205 is a specified longitudinal distance. The longitudinal distance 240 is a distance extending parallel to the longitudinal axes $y_h$, $y_t$ separating the lateral axis $x_t$ extending through the landmark 205 from the lateral axis $x_h$ extending through the second landmark 235. The computer 105 can, based on data 115 collected by the sensors 110, identify a point on the landmark 205 and project the lateral axis $x_t$ through the point, i.e., project or draw a line through the point that is perpendicular to the longitudinal axis. The point on the landmark 205 can be a point identifiable from the data 115, e.g., an edge of the landmark 205, a longitudinally forwardmost point of the landmark 205, a feature of the landmark 205 that can be distinguished from the data 115 from other parts of the landmark 205, etc. The computer 105 can identify a point on the second landmark 235 and project the lateral axis $x_h$ through the point. The longitudinal distance 240 is the distance between the lateral axes $x_h$, $x_t$ perpendicular to the lateral axes $x_h$, $x_t$, i.e., in a longitudinal direction. The specified longitudinal distance can be a predetermined distance stored in the data store 106 and/or server 130. Alternatively, the computer 105 can prompt the user for input to determine the specified longitudinal distance. For example, the user can provide input specifying the longitudinal distance 240 to a specific value, e.g., zero, one meter, etc.

Figure 3:
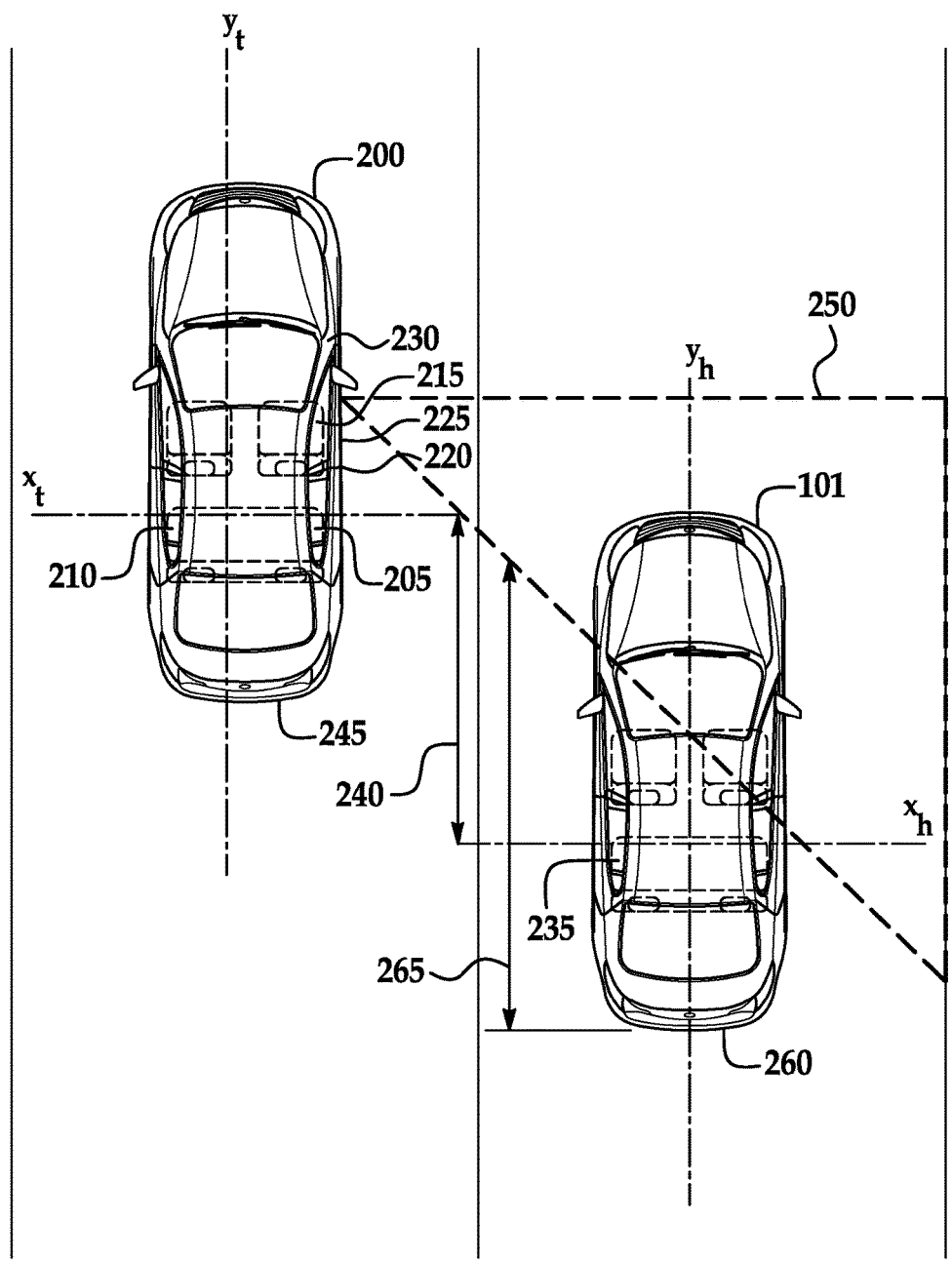
FIG. 3 is a view of a blind spot of the target vehicle.
Figure 4:
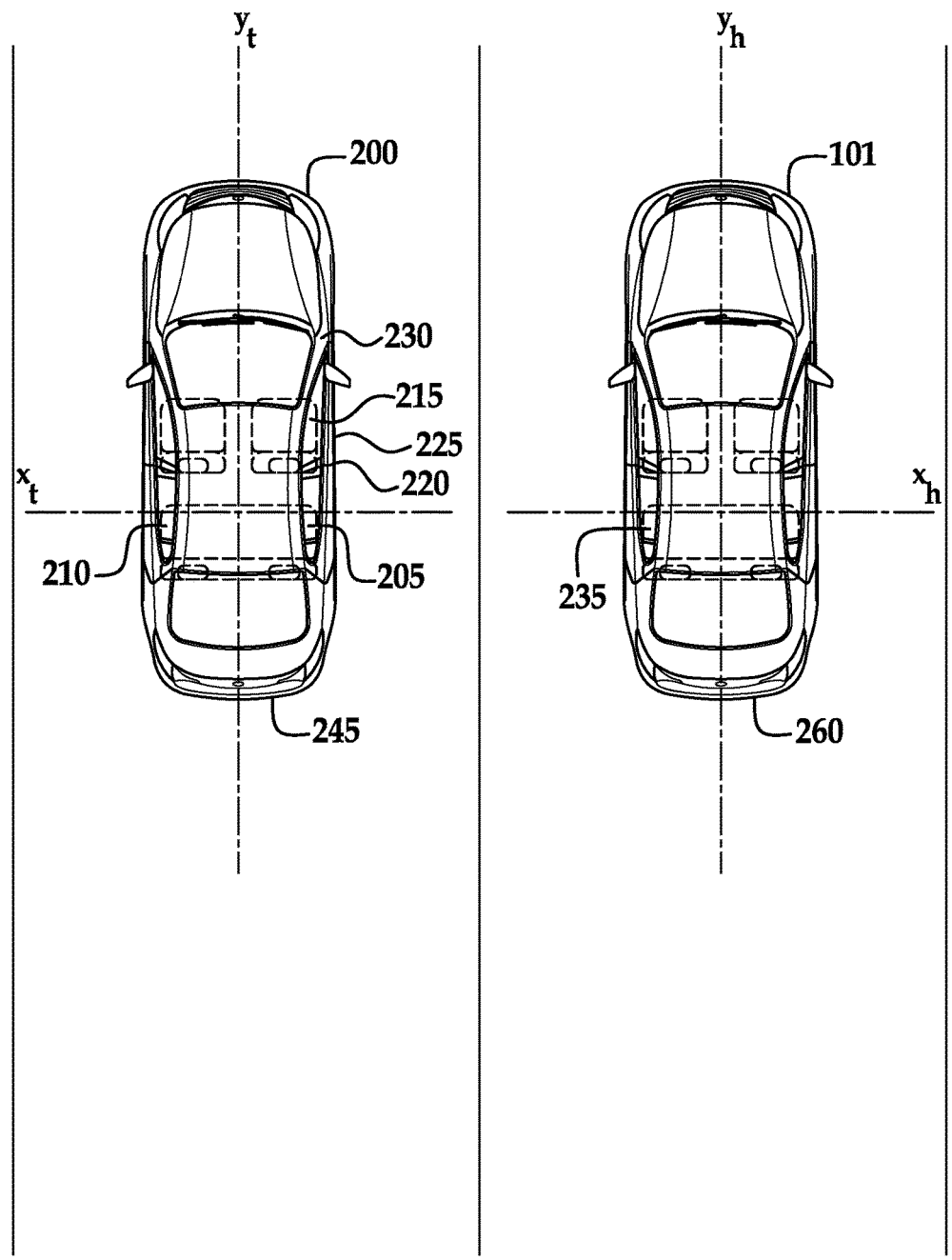
FIG. 4 is a view of the host vehicle aligned with the target vehicle.

The computer 105 can project the target lateral axis $x_t$ through the landmark 205 and the host lateral axis $x_h$ through the second landmark 235. In FIGS. 2-4, the landmark 205 is the rear seat 210 of the target vehicle 200, and the lateral axis $x_t$ extends through the rear seat 210. The computer 105 can determine the longitudinal distance 240 between the lateral axes $x_h$, $x_t$. The computer 105 can actuate one or more components 120 to move the host vehicle 101 until the longitudinal distance 240 between the lateral axes $x_h$, $x_t$ is within a predetermined threshold of the specific longitudinal distance.

The computer 105 can detect the landmark 205 and project the lateral axis $x_t$ by collecting data 115 from the sensors 110, e.g., image data 115 from a camera 110, radar data 115 from the radar 110, LIDAR data 115 from the LIDAR, ultrasonic data 115 from the ultrasonic transducer 110, etc. The computer 105 can compare the data 115 to stored data 115 in the data store 106 and/or the server 130 of stored components 120 (e.g., a rear seat 210, a front seat 215, a seam 225, etc.) and, using known data processing techniques, determine whether the data 115 includes the landmark 205. For example, the image data 115 can include an image of a rear vehicle seat 210 in the target vehicle 200, and upon identifying the rear vehicle seat 210, the computer 105 can identify the rear vehicle seat 210 as the landmark 205. The computer 105 can identify a point on the rear vehicle seat 210, e.g., a point on an edge of the rear vehicle seat 210, and project the lateral axis $x_t$ extending through the point along the lateral direction (i.e., from the driver's side to the passenger's side of the target vehicle 200). In another example, the image data 115 can include a door seam 225, and the computer 105 can project the lateral axis $x_t$ through the door seam 225. In another example, the image data 115 can include a rear bumper 245 of the target vehicle 200, and the computer 105 can identify a point on a side of the target vehicle 200 positioned a predetermined longitudinal distance from a rearmost point of the rear bumper 245.

The computer 105 can identify a speed of the target vehicle 200 with the data 115 collected from one or more sensors 110. Upon identifying the speed of the target vehicle, the computer 105 can adjust one or more components to move the host vehicle 101 until the distance between the lateral axes $x_h$, $x_t$ is the specified longitudinal distance. The computer 105 can instruct the propulsion 120 to accelerate the host vehicle 101 until the longitudinal distance 240 is the specified longitudinal distance and then to maintain the propulsion 120 so that the speed of the host vehicle 101 is (or is within a predetermined speed threshold of) the speed of the target vehicle 200. When the speed of the target vehicle 200 is zero, e.g., at a traffic stop, the computer 105 can instruct the brakes 120 to slow the host vehicle 101 until stopping such that the lateral axes $x_h$, $x_t$ are the specified longitudinal distance from one another.

FIG. 3 illustrates a blind spot 250 of the target vehicle 200. As used herein, a "blind spot" is a portion of a roadway lane that cannot typically be viewed by a vehicle operator via a side mirror, e.g., the side mirror 255 of the target vehicle 200. Based on a position of the side mirror 255, a portion of the roadway lane adjacent (i.e., immediately next to) to the current roadway lane of a vehicle 101 may not be visible in the side mirror 255 when viewed from an operator's e.g., a driver's, seat. The portion of the roadway not visible is the "blind spot" of the side mirror 255. Furthermore, portions of roadway lanes beyond the adjacent roadway lane may not be visible in the side mirror 255. That is, the blind spot can include portions of more than one roadway lane.

The host vehicle 101 can detect the blind spot 250 based on the image data 115 of the side mirror 255 of the target vehicle 200. The computer 105 can adjust the specified longitudinal distance such that at least a portion of the host vehicle 101 is out of the blind spot 250. For example, if the current specific longitudinal distance would move the host vehicle 101 entirely into the blind spot 250 of the target vehicle, the computer 105 can increase the specified longitudinal distance until a portion of the host vehicle 101 (e.g., a rear bumper 260 of the host vehicle 101) is at least a second specified longitudinal distance 265 away from the blind spot 250.

FIG. 4 illustrates the host vehicle 101 and the target vehicle 200 aligned, i.e., the specific longitudinal distance is zero. The occupant can instruct the computer 105 to align the host vehicle 101 with the target vehicle 200, i.e., assign the specified longitudinal distance to zero. When the specified longitudinal distance is zero, the lateral axes $x_h$, $x_t$ are collinear. To align the host vehicle 101 with the target vehicle 200, the computer 105 can be programmed to move the host vehicle 101 until the longitudinal distance 240 between the lateral axes $x_h$, $x_t$ is zero. Alternatively, the computer 105 can be programmed to move the host vehicle 101 until a front window of the host vehicle 101 is within a distance threshold (as determined by the image data 115) of a front window of the target vehicle 200. The occupant can instruct the computer 105 to align the host vehicle 101 with the target vehicle 200 to, e.g., communicate with an occupant in the target vehicle 200, approach a traffic stop ahead of the host vehicle 101, etc.

Figure 5:
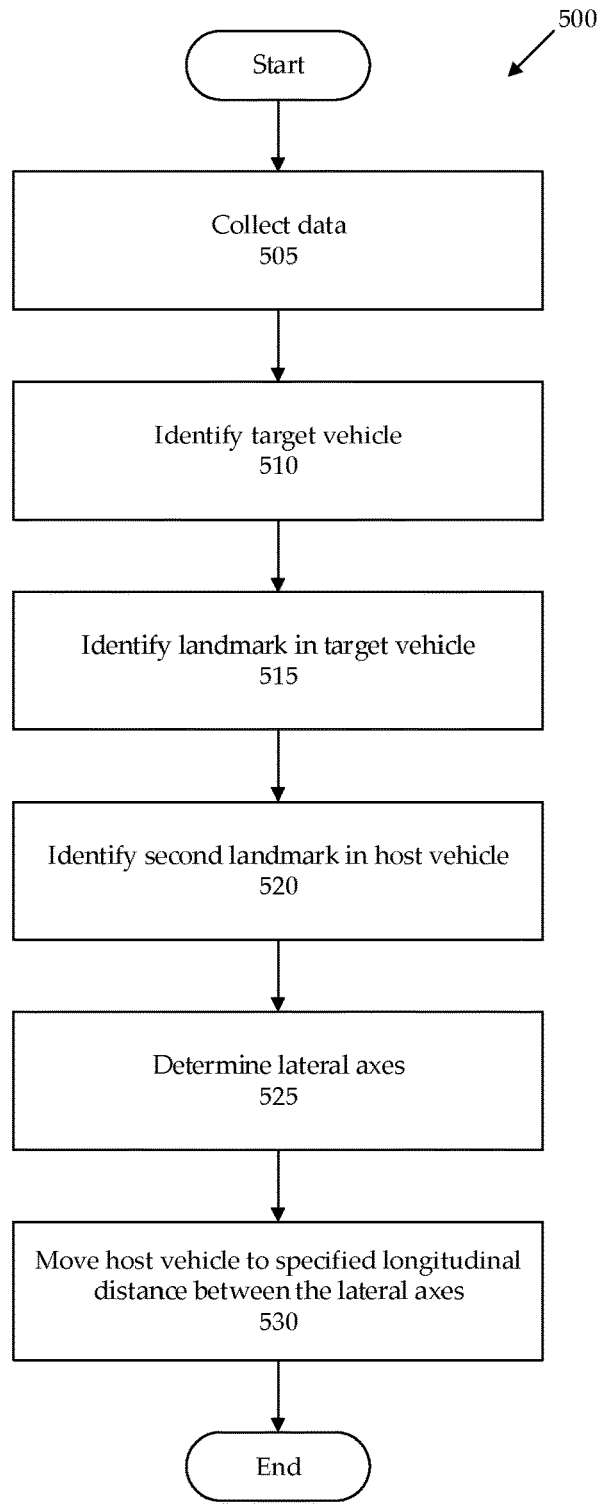
FIG. 5 is a block diagram of an example process for staggering the host vehicle from the target vehicle.

FIG. 5 illustrates a process 500 for staggering a host vehicle 101 from a target vehicle. The process 500 begins in a block 505, in which the computer 105 collects data 115 from one or more sensors 110. The computer 105 can collect image data 115 from one or more cameras 110 from around the host vehicle 101, including data 115 about objects in adjacent roadway lanes. Alternatively or additionally, the computer 105 can collect data 115 from one or more other sensor 110, e.g., a LIDAR, a radar, an ultrasonic transducer, etc.

Next, in a block 510, the computer 105 identifies the target vehicle 200 based on the data 115. The computer 105 can, using known processing techniques, identify that an object in an adjacent roadway lane is another vehicle, e.g., a target vehicle 200. For example, the computer 105 can use known image processing techniques for image data 115 collected by a camera 110. Alternatively or additionally, the computer 105 can process data 115 from, e.g., a LIDAR, a radar, an ultrasonic transducer, etc. to identify the target vehicle 200.

Next, in a block 515, the computer 105 identifies a landmark 205 in the target vehicle 200 based on the data 115. As described above, the landmark 205 is a part of the target vehicle 200 that is identifiable from the data 115. The landmark 205 can be, e.g., a rear vehicle seat 210, a front vehicle seat 215, a seam 220 between a vehicle door 225 and a vehicle frame 230, a predetermined distance from a rear bumper 245, etc.

Next, in a block 520, the computer 105 identifies a second landmark 235 in the host vehicle 101. As described above, the second landmark 235 can be a predetermined component 120 of the host vehicle 101 (e.g., a seat, a door, etc.).

Next, in a block 525, the computer 105 identifies the lateral axes $x_h$, $x_t$ extending through the landmark 205 and the second landmark 235. As described above, the computer 105 can project the lateral axis $x_t$ through a specified point on the landmark 205 and the lateral axis $x_h$ through a specified point on the second landmark 235. The computer 105 can project the lateral axes $x_h$, $x_t$ based on the collected image data 115.

Next, in a block 530, the computer 105 moves the host vehicle 101 until the longitudinal distance 240 between the lateral axes $x_h$, $x_t$ is a specified longitudinal distance (or is within a predetermined threshold of the specified longitudinal distance). The computer 105 can, using known image processing techniques, determine the longitudinal distance 240 between the lateral axes $x_h$, $x_t$ and instruct the vehicle components 120 to move the vehicle until the longitudinal distance 240 is the specified longitudinal distance. Following the block 530, the process 500 ends.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, data collector measurements, computations, processing time, communications time, etc.

Computers 105 generally each include instructions executable by one or more computers such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computer 105 is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 500, one or more of the steps could be omitted, or the steps could be executed in a different order than shown in FIG. 5. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

What is claimed is:

1. A system, comprising a computer including a processor and a memory, the memory storing instructions executable by the processor to:
   identify a first landmark that is a specified object installed to a target vehicle; and
   move a host vehicle laterally adjacent to the target vehicle such that a second landmark that is a specified object installed to the host vehicle is a specified longitudinal distance from the first landmark.

2. The system of claim 1, wherein the instructions further include instructions to identify the first landmark based on a predetermined longitudinal distance forward of a rear end of the target vehicle.

3. The system of claim 1, wherein the specified longitudinal distance is zero.

4. The system of claim 1, wherein the instructions further include instructions to identify the second landmark in the host vehicle as a vehicle seat.

5. The system of claim 1, wherein the instructions further include instructions to identify the first landmark as one of a seam between a vehicle door and a frame of the target vehicle and a pillar of the target vehicle.

6. The system of claim 1, wherein the instructions further include instructions to receive user input specifying the longitudinal distance.

7. The system of claim 1, wherein the instructions further include instructions to receive user input identifying the target vehicle.

8. The system of claim 1, wherein the instructions further include instructions to determine a speed of the target vehicle and to adjust a host vehicle speed based on the speed of the target vehicle in addition to the specified longitudinal distance.

9. The system of claim 8, wherein the speed of the target vehicle is zero.

10. The system of claim 1, wherein the instructions further include instructions to identify a blind spot of the target vehicle and to determine the specified longitudinal distance such that at least a portion of the host vehicle is not in the blind spot.

11. A method, comprising:
    identifying a first landmark that is a specified object installed to a target vehicle; and
    moving a host vehicle laterally adjacent to the target vehicle such that a second landmark that is a specified object installed to the host vehicle is a specified longitudinal distance from the first landmark.

12. The method of claim 11, further comprising identifying the first landmark based on a predetermined longitudinal distance forward of a rear end of the target vehicle.

13. The method of claim 11, wherein the specified longitudinal distance is zero.

14. The method of claim 11, further comprising identifying the second landmark in the host vehicle as a vehicle seat.

15. The method of claim 11, further comprising identifying the first landmark as one of a seam between a vehicle door and a frame of the target vehicle and a pillar of the target vehicle.

16. The method of claim 11, further comprising receiving user input specifying the longitudinal distance.

17. The method of claim 11, further comprising receiving user input identifying the target vehicle.

18. The method of claim 11, further comprising determining a speed of the target vehicle and adjusting a host vehicle speed based on the speed of the target vehicle in addition to the specified longitudinal distance.

19. The method of claim 18, wherein the speed of the target vehicle is zero.

20. The method of claim 11, further comprising identifying a blind spot of the target vehicle and determining the specified longitudinal distance such that at least a portion of the host vehicle is not in the blind spot.

\* \* \* \* \*